United States Patent
Hall et al.

(10) Patent No.: US 7,196,653 B2
(45) Date of Patent: Mar. 27, 2007

(54) IMAGING APPARATUS AND METHOD

(75) Inventors: Charles David Hall, Portsmouth (GB); David Martin Priestley, Old Portsmouth (GB)

(73) Assignee: Astrium Limited, Stevenage (GB)

( * ) Notice: Subject to any disclaimer, the term of this patent is extended or adjusted under 35 U.S.C. 154(b) by 0 days.

(21) Appl. No.: 10/502,755

(22) PCT Filed: May 20, 2004

(86) PCT No.: PCT/GB2004/002208

§ 371 (c)(1),
(2), (4) Date: Sep. 1, 2004

(87) PCT Pub. No.: WO2004/104630

PCT Pub. Date: Dec. 2, 2004

(65) Prior Publication Data

US 2005/0104763 A1    May 19, 2005

(30) Foreign Application Priority Data

May 21, 2003 (EP) ................................. 03253158
May 21, 2003 (GB) ................................. 0311646.4

(51) Int. Cl.
    *G01S 13/89*      (2006.01)
    *G01S 13/90*      (2006.01)
    *G01S 7/40*      (2006.01)
    *G01S 13/00*      (2006.01)

(52) U.S. Cl. ................. 342/25 F; 342/25 R; 342/25 A; 342/25 D; 342/73; 342/74; 342/75; 342/81; 342/82; 342/165; 342/173; 342/175; 342/176; 342/179; 342/189; 342/195; 342/196

(58) Field of Classification Search .... 342/25 R–25 F, 342/147–158, 175, 176, 179, 192–197, 104, 342/107, 108–113, 115, 118, 128–146, 52, 342/73–81, 82–88, 164–174, 189
See application file for complete search history.

(56) References Cited

U.S. PATENT DOCUMENTS 4,084,158 A * 4/1978 Slawsby ................... 342/25 F (Continued)

FOREIGN PATENT DOCUMENTS

DE      3114600 C2    6/1990

(Continued)

*Primary Examiner*—Bernarr E. Gregory
(74) *Attorney, Agent, or Firm*—Nixon & Vanderhye P.C.

(57) ABSTRACT

An imaging apparatus has transmitter illuminating a selected surface with a radar beam footprint, and processor for profiling/processing the radar returns so as to derive attitude information in real time about a number of predefined axes associated with the radar which depends upon the relative dispositions of the radar, the selected surface and upon the radar beam footprint characteristics.

A plurality of transmit beams image the surface and the processing arrangement has the capability of determining roll, pitch and/or yaw pointing data associated with the radar, such pointing data being determined by derivation of the attitude information and by selective input of terrain elevation data so as to take account of variations in the radar viewing geometry with terrain elevation.

This provides a low cost advantage over known radar designs, and retains utility for many applications, for example spaceborne and airborne applications.

21 Claims, 11 Drawing Sheets

U.S. PATENT DOCUMENTS

| | | | |
|---|---|---|---|
| 4,990,922 A * | 2/1991 | Young et al. | 342/52 |
| H955 H * | 8/1991 | Waters | 342/108 |
| 5,166,688 A | 11/1992 | Moreira | |
| 5,440,309 A | 8/1995 | Moreira et al. | |
| 5,552,787 A * | 9/1996 | Schuler et al. | 342/25 A |
| 6,661,369 B1 * | 12/2003 | Cho | 342/25 R |

FOREIGN PATENT DOCUMENTS

| | | |
|---|---|---|
| EP | 0 076 877 A1 | 4/1983 |
| JP | 57-46173 | 3/1982 |
| JP | 59-49613 | 3/1984 |
| JP | 6-194444 | 7/1994 |

* cited by examiner

| Incidence angle (beam centre) (degrees) | Approximate slant range (at beam centre) (km) | Ground footprint (cross track) (km) | Ground footprint (along track) (km) |
|---|---|---|---|
| 20 | 530 | 31 | 14 |
| 50 | 741 | 63 | 28 |

IMAGING APPARATUS AND METHOD

This application is the U.S. national phase of international application PCT/GB04/02208 filed 20 May 2004, which designated the US and claims priority to GB Application No. 0311646.4, filed 21 May 2003 and EP Application No. 03253158.4, filed 21 May 2003. The entire contents of these applications are incorporated herein by reference.

FIELD OF THE INVENTION

This invention concerns improvements relating to an imaging apparatus and method. More particularly, though not exclusively, this invention concerns synthetic aperture imaging apparatus for imaging the Earth's surface from an orbiting satellite and which is used for providing radar attitude information.

BACKGROUND OF THE INVENTION

Known Imaging Radar Principles

FIG. 1 shows an example of conventional imaging radar apparatus orbiting the Earth. As shown in the Figure, the imaging radar is an active instrument that illuminates the ground through a narrow beam antenna which is also used to receive the radiation scattered back by the ground. Ground illumination is by a sequence of short radar pulses, repeated typically at a rate of a few kHz, as the antenna moves steadily along track. The received radar pulse reflection sequence is sampled at a high rate and can then be processed to form maps of the ground radar reflectivity (images) and other ground information products.

The radar Operator is obliged to provide image data for the ground regions defined by the Customer(s). The radar functions by accumulating reflection data as its beam footprint moves over the desired ground region. In order to ensure that the correct piece of ground is illuminated by the radar, the antenna pointing direction must be known and controlled. The region illuminated by the radar is larger than the ordered image dimensions by a margin of approximately 10% (using a greater margin than this would be energy inefficient). Thus, the beam pointing accuracy is typically of the order of $1/10^{th}$ the radar beam-width in both the along track and across track senses.

Radar Operation for Image Formation

As is well known in the art of imaging radar, the radar pulse characteristics required for attitude determination differ from the characteristics necessary for image formation. A brief description of known SAR imaging pulse characteristics is given here as background.

The slant range resolution required of a SAR instrument for adequate image formation is typically significantly less than 100 m (and in some cases significantly less than 1 m). The duration of a pulse of un-modulation microwave carrier capable of this slant range resolution is typically sub-microsecond (the required spatial resolution sets the necessary pulse bandwidth). In order to achieve adequate radiometric resolution, each ground resolution cell must also be illuminated with sufficient energy to ensure that the radiation it scatters back to the antenna is received with sufficient signal to noise ratio (SNR).

The above requirements taken together demand an un-modulated carrier pulse transmission power far higher than is practicable for a non-ground based radar system. However, a ground resolution cell can be illuminated with the same energy by using a lower power pulse but which is of correspondingly longer duration without changing the pulse bandwidth (resolution). This can be achieved in practice by modulating the microwave carrier by a tone whose frequency is ramped (usually linearly). The extent of the frequency ramp applied to the carrier is the pulse bandwidth. In this way a relatively long pulse radiation pulse is given large bandwidth (resolving power).

Thus, each SAR pulse is elongated and of moderate power, consisting of a carrier modulated by a tone of ramping frequency (sometimes called a "chirp"), and is capable of resolving ground features separated (across track) by distances determined by its slant range resolution and local angle of incidence.

Along track resolution is achieved by synthesising a large along track aperture from a sequence of radar pulses. Such synthesis is a coherent signal processing operation which extracts along track image information from the phase progression of radar reflections between successive pulses, using knowledge of the viewing geometry. For simplest processing the radar must generate a pulse every time the antenna along track position advances by the same particular distance. For many known SAR systems (space-borne in particular) this corresponds to pulse emission at equally spaced time intervals (usually less than 1 ms). Each pulse typically has the chirp characteristic as described hereinabove. In the case of a known space SAR (where the round trip delay between pulse transmission and reception of the reflection is typically a few milliseconds), several pulses are in flight simultaneously.

Received pulse reflections are typically demodulated by the radar and sampled at a rate consistent with the required slant range resolution (from 10's to 100's of MHz). Except in the case of the most demanding requirements for real-time in-flight imagery, the image is computed from the acquired data stream on the ground some time after it is acquired. Conventional SAR image processing is thus extremely computationally intensive.

Furthermore, conventional imaging radar typically relies upon the operation of a whole suite of attitude control system sensors (for example, star sensors from a space-based mission) to provide the necessary level of attitude knowledge for enabling adequately accurate pointing of the radar beam. This leads to cost disadvantages and to a high processing load.

OBJECTS AND SUMMARY OF THE INVENTION

The present invention aims to overcome or at least substantially reduce some of the above-mentioned drawbacks.

It is the principal object of the present invention to provide a low cost radar imaging apparatus which is reliable for application as an attitude sensor. This is achieved by elimination of inertial/geocentric attitude sensors from the inventive design.

In broad terms, the present invention resides in the concept of illuminating a selected surface with a radar beam footprint for imaging, and profiling/processing the resultant radar returns in an efficient, logical fashion so as to derive radar attitude information in real time about a number of predefined axes associated with the radar which depends upon the relative dispositions of the radar and the selected surface and upon the radar beam footprint characteristics.

Thus, according to a first aspect of the invention there is provided a radar imaging apparatus for imaging a surface from a platform moving relative to the surface comprising: transmitting means for transmitting radiation to the surface;

receiving means for receiving the radiation, after it has been scattered from the surface, along a predetermined receive path; and processing means for processing signals representative of the received radiation to provide radar attitude information, the attitude information being representative of the pointing of the platform resolved into a number of axial components, and wherein the attitude information is derived in dependence upon a determination of a range characteristic relative to the surface and upon a determination of a Doppler frequency distribution associated with the scattered radiation.

In accordance with a preferred embodiment of the invention which is described in detail hereinafter, a processing arrangement for processing the radar return signals makes use of: a first circuitry portion arranged to correlate the received data associated with the scattered radiation with predetermined radar antenna pattern data, a second circuitry portion arranged to derive peak position data representative of the radar antenna boresight direction, a third circuitry portion arranged to transform said peak position data into a slant range and Doppler frequency space, and a fourth circuitry portion arranged to determine said attitude information in dependence upon the various circuitry operations.

Preferably, the processing arrangement has a separate circuitry portion for determining roll, pitch and/or yaw pointing data associated with the radar platform, said pointing data being determined by derivation of the attitude information and by selective input of terrain elevation data so as to take account of variations in the radar viewing geometry with terrain elevation.

Preferably, the transmitting means is arranged to transmit a first set of radar pulses corresponding to a first elevation angle relative to the surface, which set of radar pulses includes a ranging radar pulse emitted at a first predetermined time and a frequency-discriminating radar pulse emitted at a second predetermined time, said receiving means being arranged to receive said pulses at different predetermined times, and said processing means being arranged to derive roll and pitch-axis attitude data in dependence upon the determination of a slant range and a Doppler frequency shift associated with the received pulse characteristics.

Advantageously, there are a plurality of such sets of radar pulses corresponding to a plurality of elevation angles relative to the surface, and one or more of such sets of pulses are received and processed to derive Yaw-axis attitude data in dependence upon the determination of a differential slant range and a Doppler frequency shift associated with the received pulse characteristics.

Conveniently, the transmitting means is adapted to emit continuous wave (CW) radar pulses. Alternatively, the transmitting means could be adapted to emit chirped radar pulses, if desired.

Preferably, the inventive imaging apparatus is a synthetic aperture imaging apparatus. However, it is to be appreciated that the inventive imaging apparatus is not required to be a synthetic aperture imaging-type. For example, the inventive imaging apparatus could instead comprise a forward looking imaging radar. Alternatively, the inventive imaging apparatus could comprise a highly-squinted imaging radar which looks half-sideways and half-forwards.

Further, according to a second aspect of the invention there is provided a method of imaging a surface from a platform moving relative to the surface, the method comprising the steps of: transmitting radiation to the surface; receiving the radiation, after it has been scattered from the surface, along a predetermined receive path; and processing signals representative of the received radiation to provide radar attitude information, the attitude information being representative of the pointing of the platform resolved into a number of axial components and wherein the attitude information is derived in dependence upon a determination of a range characteristic relative the surface and upon a determination of a Doppler frequency distribution associated with the scattered radiation.

The present invention also extends to a spacecraft or satellite communications system incorporating the above described imaging apparatus.

It is to be appreciated that the imaging apparatus and method of the invention can be implemented at reasonable cost, and that it has utility for various applications, for example in space-borne radar missions and air-borne radar missions. The present invention is advantageously applicable to any radar waveband.

It is also to be appreciated that the present invention can be conveniently used to establish spacecraft pointing about two reference axes with feasible computational effort, a reasonable data storage requirement and with sufficient precision to ensure that reliable data are collected by the radar during imaging. Where there is limited beam steering capability, the inventive attitude sensor may also advantageously bear some degree of sensitivity to Yaw angle depointing.

Conveniently, the present invention may be embodied in software.

It is to be also noted that the present invention can be advantageously deployed in closed loop attitude control of the radar bearing platform before, during and after radar imaging phases. This can be readily achieved without using any ground-based system resources.

The above and further features of the inventions are set forth with particularity in the appended claims and will be described hereinafter with reference to the accompanying drawings.

Figures 1, 1A:
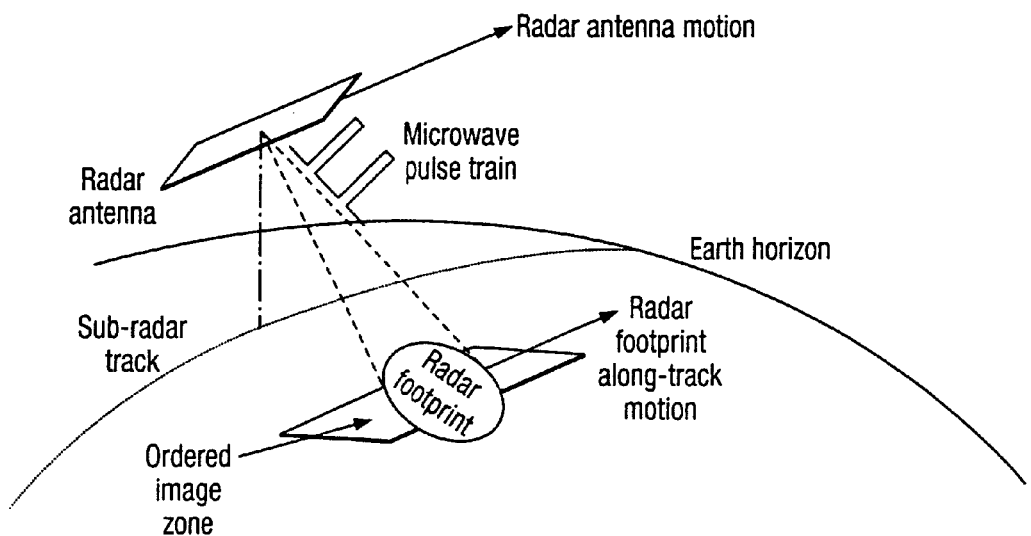
FIG. 1 shows a conventional radar arrangement imaging the earth's surface.
Figure 2:
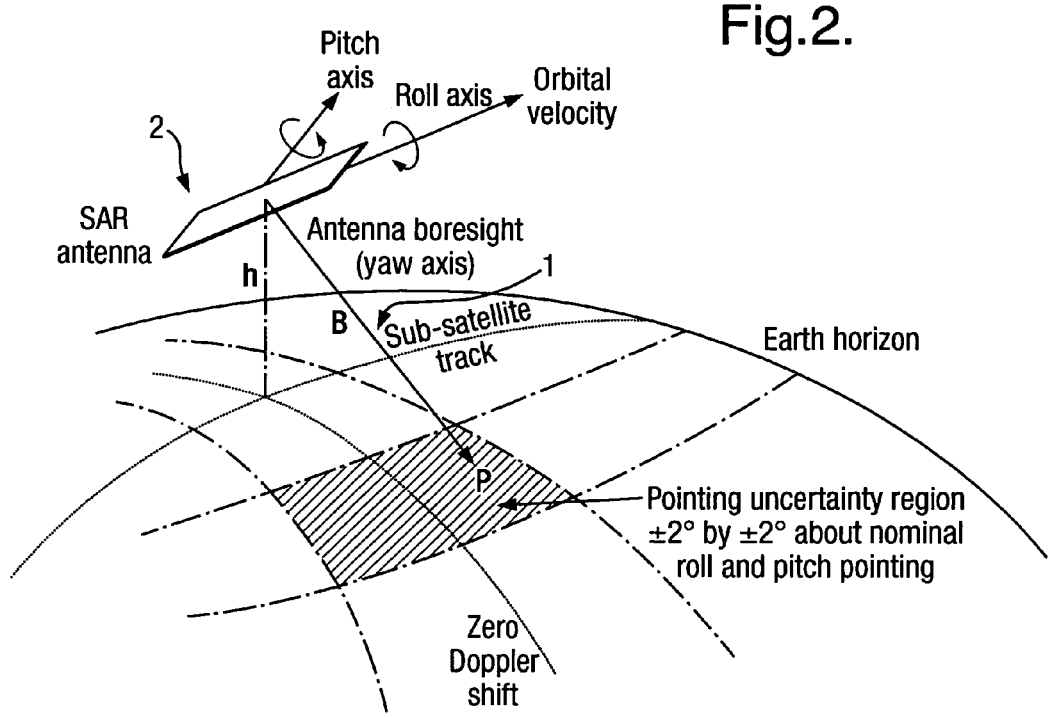
Figure 3:
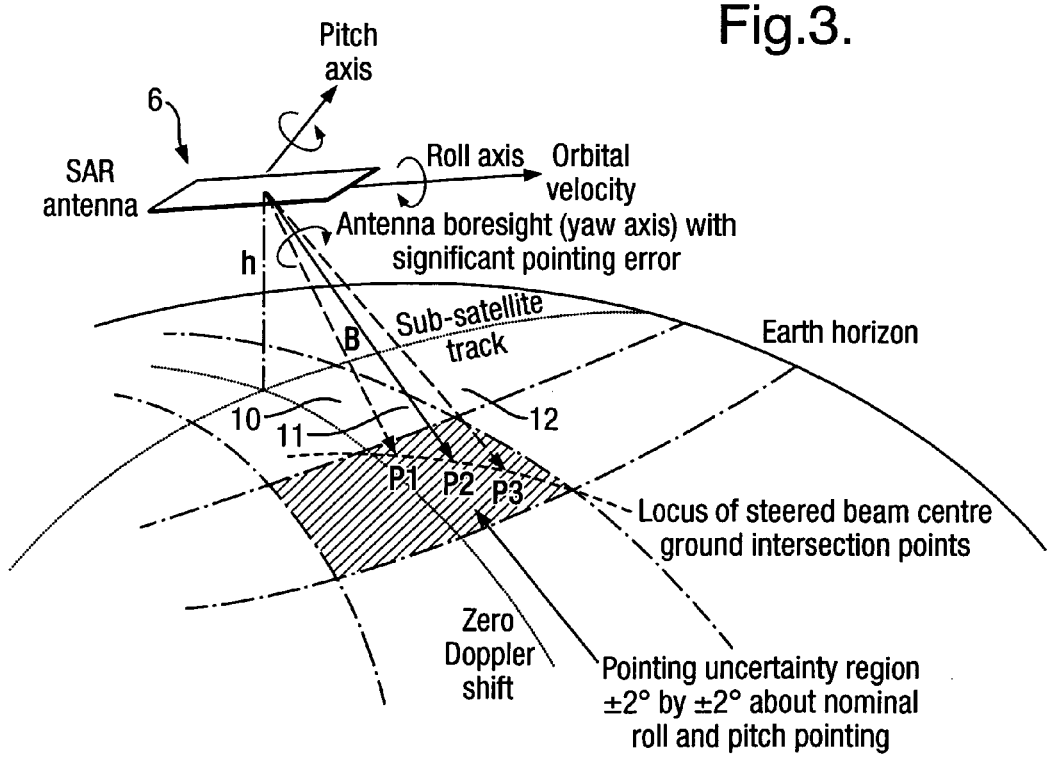
Figure 4:
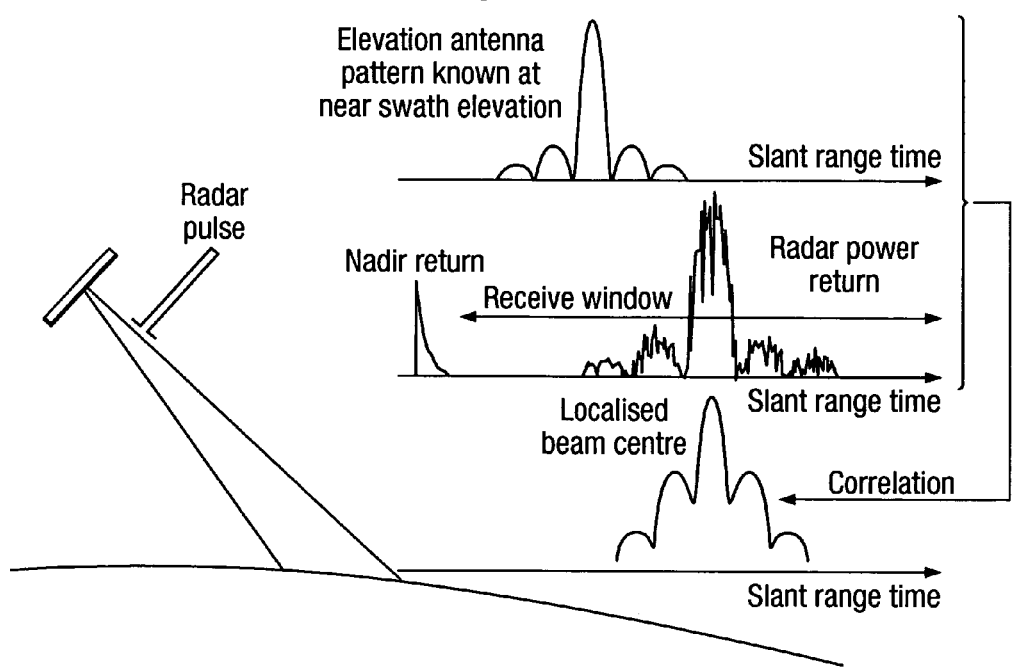
Figure 5:
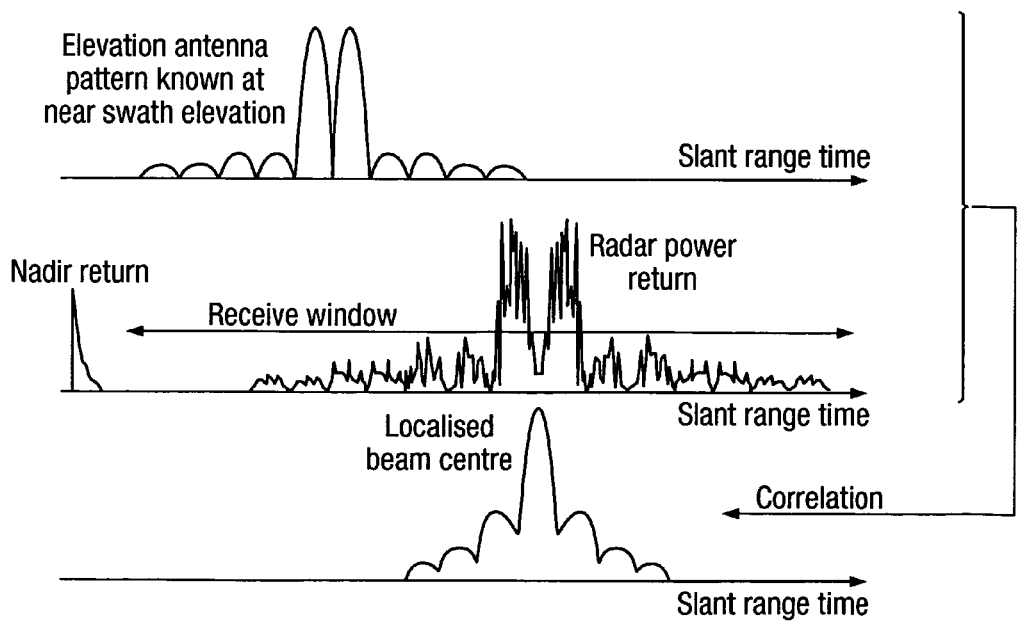
Figure 6:
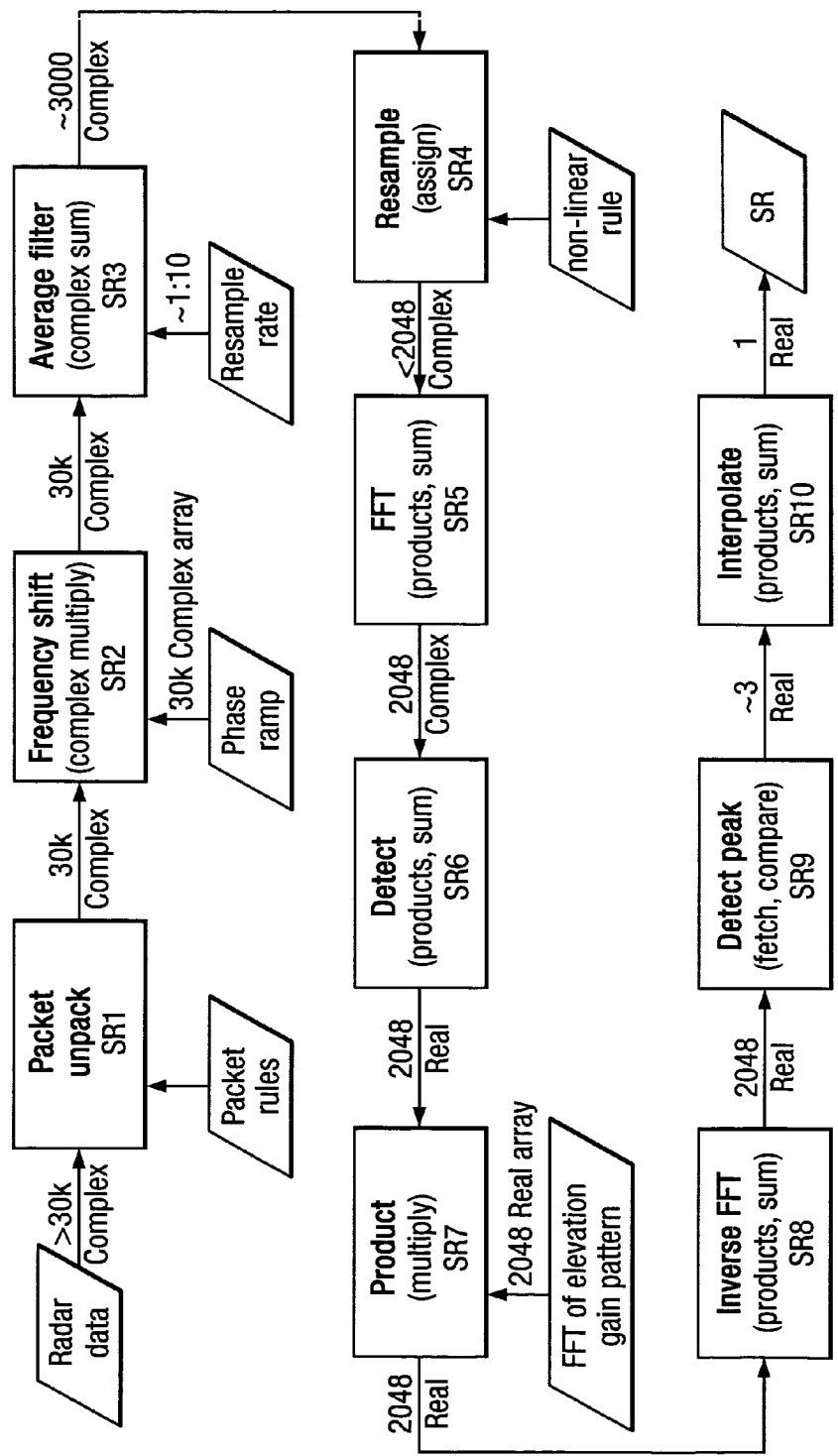
Figure 7:
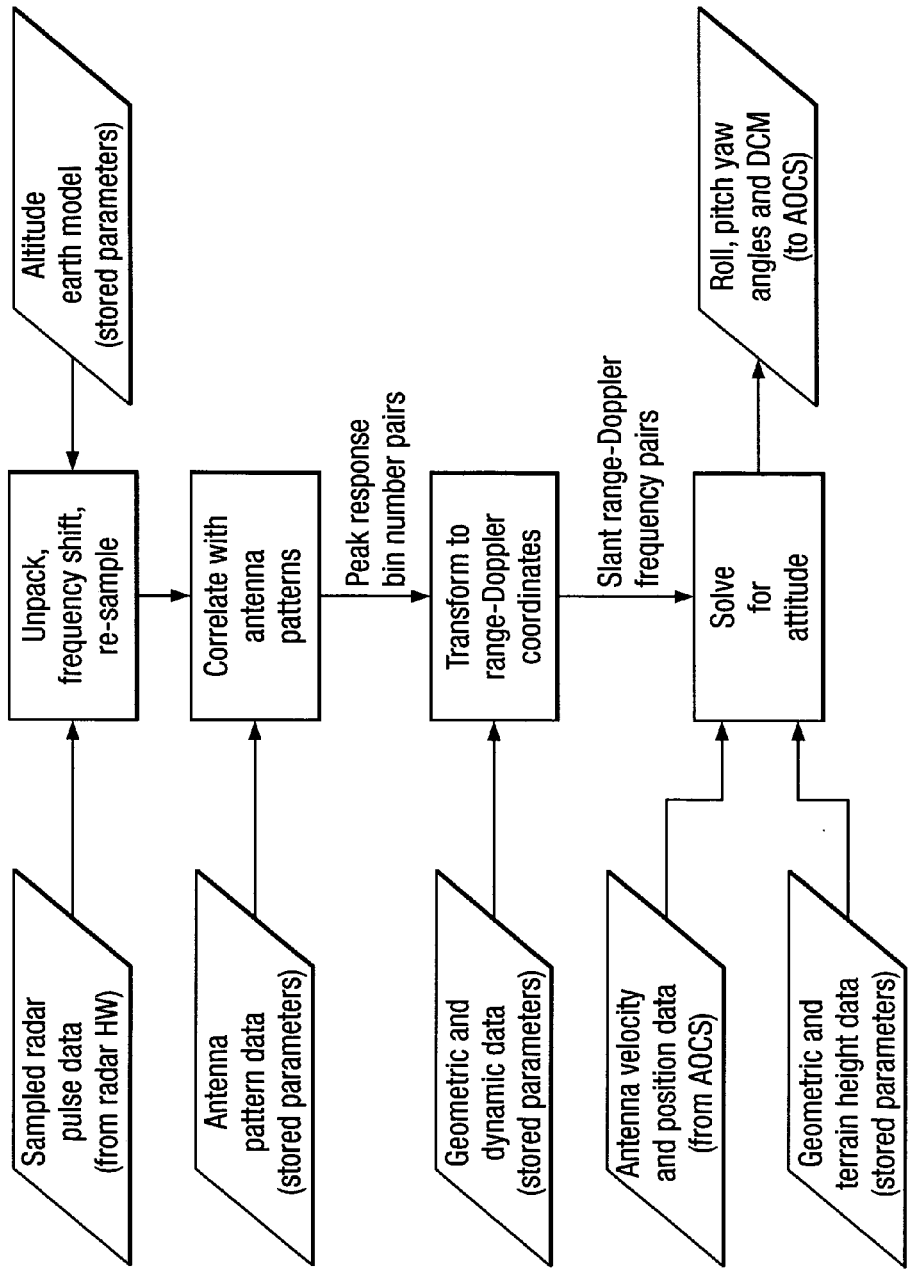
Figure 8:
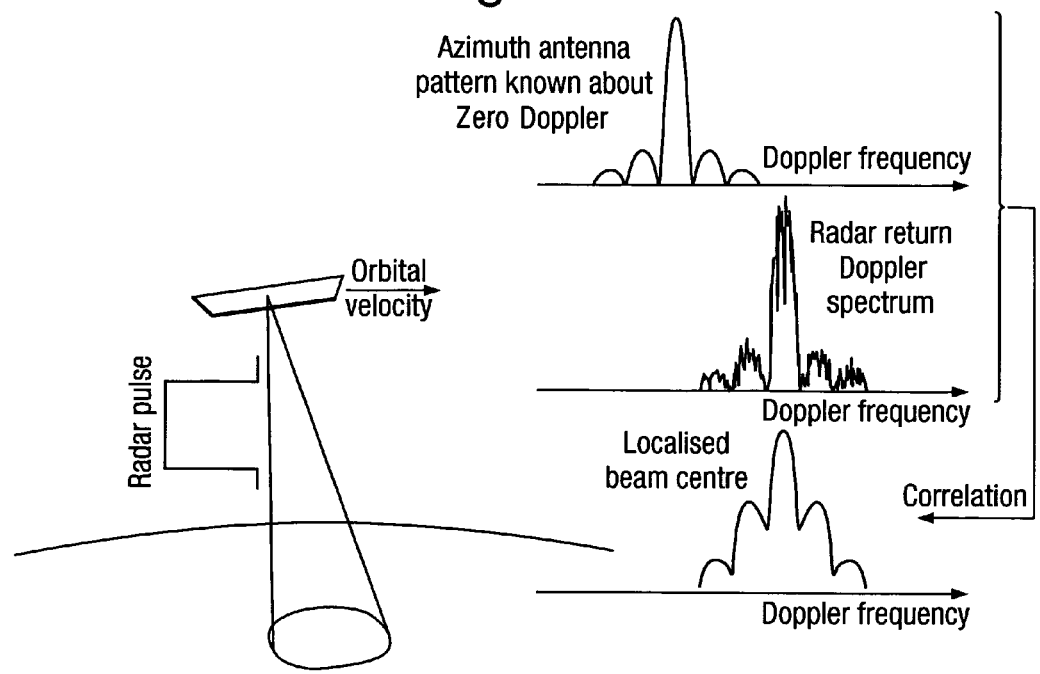
Figure 9:
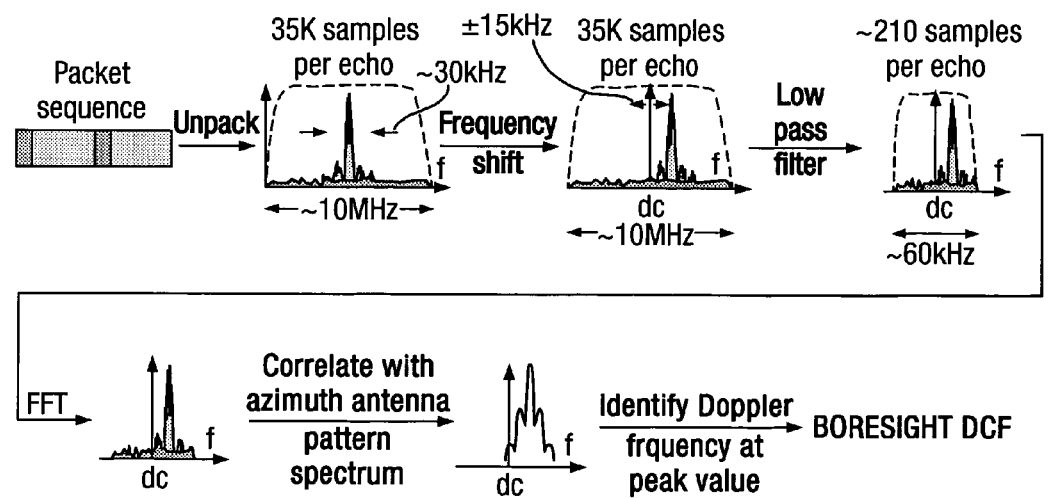
Figure 10:
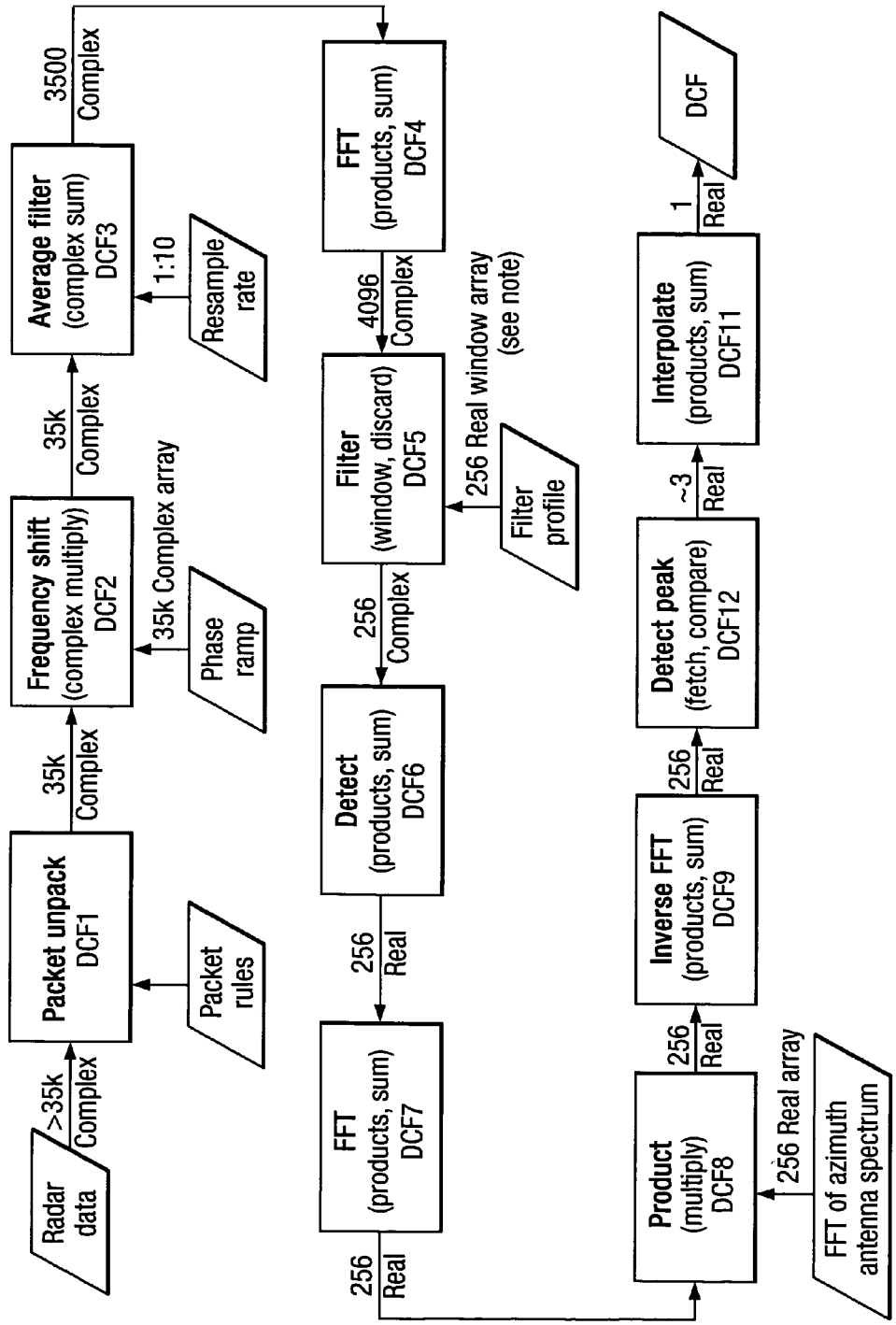
Figure 11:
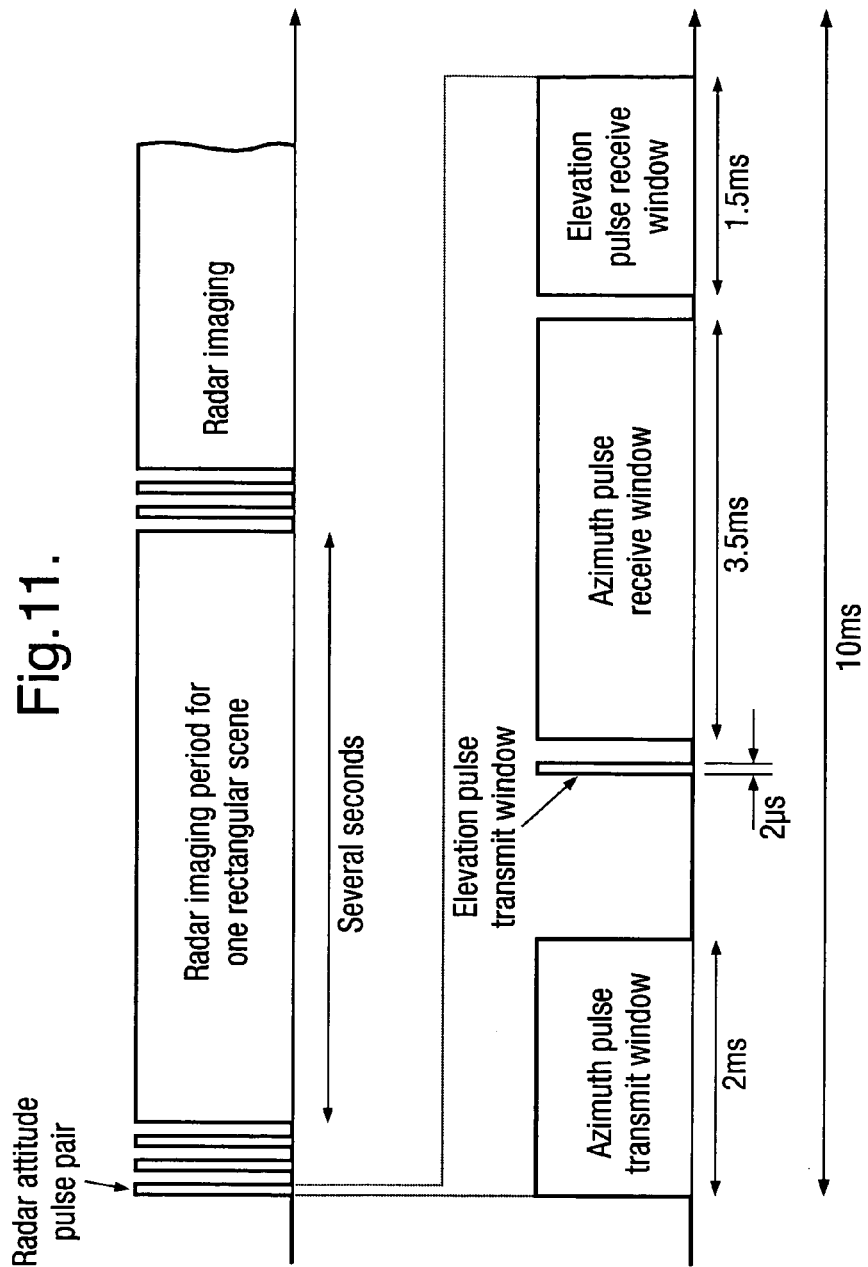
Figure 12:
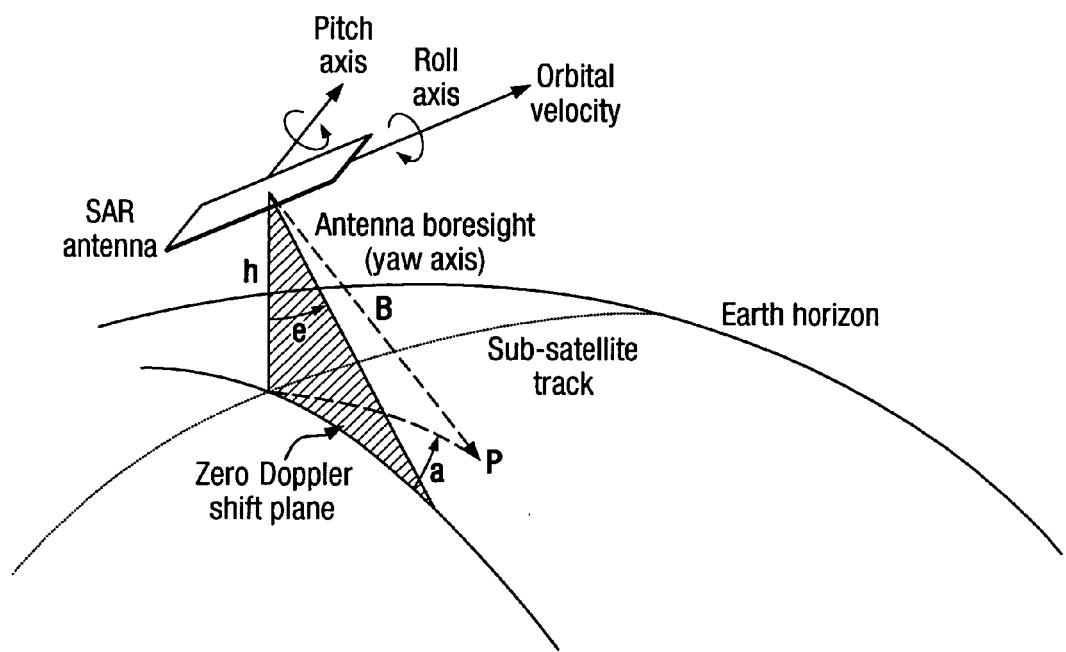
Figure 13:
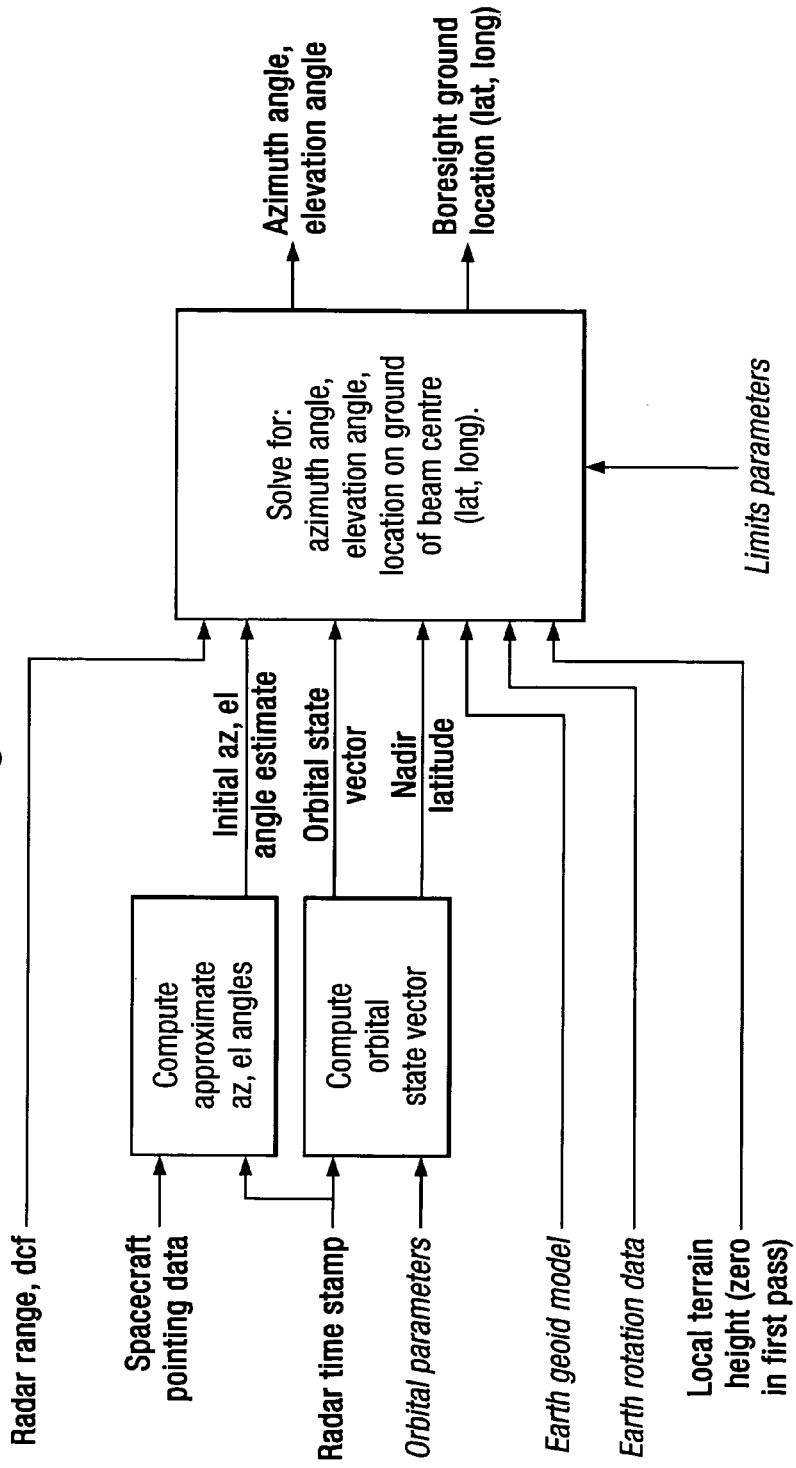
Figure 14:
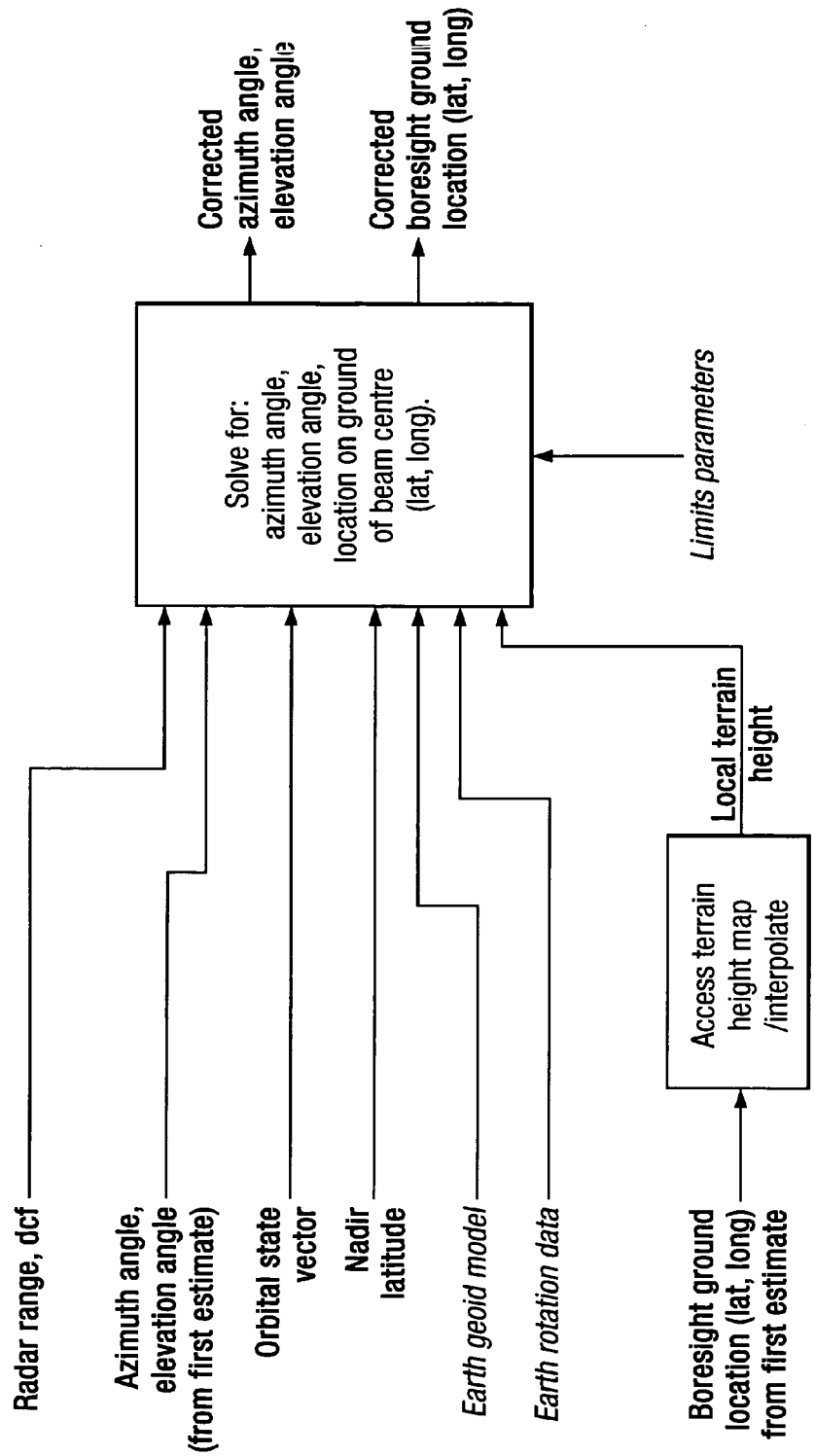

FIG. A shows a table which summaries typical lobe footprint characteristics of the inventive radar antenna;

FIG. 2 is an explanatory diagram relating to the operation of radar imaging apparatus in accordance with an embodiment of the invention;

FIG. 3 shows a radar attitude sensing arrangement imaging the earth's surface in accordance with another embodiment of the invention;

FIG. 4 shows how ranging is determined in an embodiment of the present invention by correlating radar returns with a predetermined radar antenna pattern;

FIG. 5 shows how a refinement to the range is determined in accordance with an embodiment of the invention by correlating radar returns with a predetermined centre null antenna pattern;

FIG. 6 shows a chart of various processing steps for implementation in an embodiment of the invention;

FIG. 7 shows another chart of various processing steps for implementation in an embodiment of the invention;

FIG. 8 shows how the Doppler Centre Frequency of radar returns is determined in accordance with an embodiment of the invention;

FIG. 9 shows a sequence of preferred signal transformations proposed for use in the invention;

FIG. 10 shows another chart of various processing steps for implementation in an embodiment of the invention;

FIG. 11 shows a preferred operation timeline relating to radar attitude measurement in the present invention;

FIG. 12 shows a natural radar attitude sensor pointing frame applicable to the present invention;

FIG. 13 is an explanatory diagram relating to the estimation of radar pointing in accordance with an embodiment of the invention; and FIG. 14 is another explanatory diagram relating to correction of the radar pointing estimation procedure of FIG. 13.

DETAILED DESCRIPTION OF PREFERRED EMBODIMENTS

The inventive attitude sensing technique to be described hereinafter relies for its success upon the acquisition of radar echo data from a selected scattering surface, the surface of the Earth for example. Radar instruments that are particularly suited to providing this type of data may be airborne or space borne, and frequently make use of synthetic aperture processing so as to enhance the spatial resolution on the ground that tee imaging creates. However, whilst the described inventive attitude sensing technique is well-suited to synthetic aperture radar (SAR), it is equally suited to other radar types (for example, forward looking imaging radar and highly squinted imaging radar which look half sideways/half forwards). Accordingly, the term "radar" is used in the description throughout.

In the following description, there is first provided a summary of the basic assumptions underlying the description of the preferred embodiments of the invention. Thereafter, there is provided a description of how the capabilities of the inventive radar can be effectively exploited for onboard, real-time antenna attitude determination in the context of space radar (although it is to be noted that the invention is not limited to space radar types).

Assumptions Underlying Description of Preferred Embodiments

Spacecraft Orbit 500 km altitude is assumed for the purposes of this discussion.

AOCS Attitude Determination Accuracy

It is assumed that a low cost AOCS is capable of attitude determination to an accuracy of the order of ±2° about each of three axes. Comparable pointing accuracy is assumed.

Axis Definitions

For the purposes of clear discussion, the reference axes are defined here to coincide with the primary radar antenna axes as follows:

Roll axis: parallel to long antenna axis (therefore along the nominal flight velocity vector).

Pitch axis: perpendicular to the Roll axis, in the plane of the antenna.

Yaw axis: perpendicular to both Roll and Pitch axes—through the nominal antenna main lobes.

In practice these axes may not correspond to the spacecraft control axes. This does not present a coordinate transformation problem.

Radar Antenna Patterns and Swath Coverage

For the sake of this discussion, the antenna dimensions are taken to be 1.1 m high (measured along Pitch axis) by 2.5 m long (measured along Roll axis). The null to null main antenna lobe angular widths are therefore 3.13° in elevation and 1.38° in azimuth. Useful angles of incidence are assumed to be between 20° and 50° from the local nadir. At an altitude of 500 km the footprints of illumination (measured between the first antenna pattern nulls) have the following characteristics as tabulated in FIG. A.

Core Radar Capabilities

The following assumptions are made concerning the inventive radar capabilities:

Flexibility in radar pulse rate—from single pulse to pulse repetition frequencies approaching 40 kHz are possible.

Single radar pulse durations between about 1 µs and a maximum of 2 ms are available.

Demodulated radar return information with useful components at DC must be avoided. Some form of carrier modulation must be used.

Carrier phase modulation by a simple tone or by linear frequency ramp (the normal modulation mode) are both possible.

Multiple antenna phase centres may be available enabling, for example, an elevation antenna boresight null to be synthesised.

A small selection of pre-sampling anti-alias filters is available in the receive chain, the lowest bandwidth of which is of the order of 10 MHz, which could be used for radar attitude sensor modes.

Concomitant sampling rates can be programmed.

BAQ can be turned off.

Using the lowest available sampling rate, the echo line buffer is effectively of unlimited length.

A Data Management Unit (DMU) is available to buffer small numbers of successive echoes.

The DMU can be accessed by a radar attitude determination computer.

Limited elevation beam steering is available.

SAR Modes and Operation

Stripmap, Scansar and Spotlight are the preferred inventive radar imaging modes. Gaps between radar imaging periods are envisaged to be used to acquire radar attitude sensor data.

Radar Attitude Sensor Functional Performance Goals

In both the across track and along track directions, the half width of the main antenna lobe is smaller than the expected AOCS attitude determination error. Thus, uncertainty in the spacecraft pointing at any time could potentially cause the wrong piece of ground to be illuminated by the radar.

In order to guarantee that radar returns are collected from the right region of the Earth in the across track direction, the elevation beam must be steered (by some means) to an accuracy better than that possible using coarse AOCS sensors alone. This steering must be complete before imaging commences. In the preferred embodiment of the invention, the radar is used to establish the roll pointing error relative to that required for the scene in question. Knowledge of this pointing error can be used to steer the elevation beam, by causing either:

mechanical re-pointing of the spacecraft about the roll axis, or:

electronically programmed steering of the elevation beam.

For radar image forming purposes, the across track beam pointing accuracy goal is taken to be of the order of $\pm\frac{1}{10}^{th}$ the elevation 3 db beam width, that is approximately ±0.15°.

Given a properly pointed elevation beam, the target ground area is bound to transit the beam at some time, as a result of the along track motion of the spacecraft. In order to guarantee that the appropriate data is collected, the radar is used to establish the pitch pointing error relative to that required for the scene in question. This data can be used to program correct data collection by causing either:

mechanical re-pointing of the spacecraft about the pitch axis, or:

electronically programmed steering of the azimuth beam, or:

appropriate timing of the radar pulse transmission and return reception.

The along track beam pointing accuracy goal is taken to be of the order of $\pm \frac{1}{10}^{th}$ the azimuth 3 db beam width, that is approximately ±0.07°.

Primary Performance Characteristics of Radar Attitude Sensor

From the standpoint of an AOCS, the critical performance characteristics of an attitude sensor are:
angular resolution,
noise characteristics,
read-out rate,
accuracy.

It is likely that sufficient angular resolution can be achieved by a radar attitude sensor.

Statistically independent radar attitude sensor measurements are obtained by illuminating different pieces of ground. With an along track ground speed of the order of 7 kms$^{-1}$, statistically independent measurements would be typically available from the radar only every 2 to 3 seconds (see FIG. A). Compared with the majority of AOCS sensors this is a very low read-out rate.

Although the radar is a precision ranging device, the sources of error require study. However, it is worth noting here that since the spacecraft pointing is computed from radar data using the geometry of the orbit and the Earth geoid, local terrain height influences the accuracy of any particular attitude measurement. For example, at a measured radar range of 600 km a terrain height error of 1 km would typically introduce a Roll pointing error of approximately 0.17° if left uncompensated. This error is greater than the desired beam pointing accuracy. Thus, variations in terrain height from the geoid model surface are compensated to some degree. In the preferred embodiments of the invention, the use of a terrain elevation map on a coarse grid is considered to be sufficiently effective for terrain height correction.

Discussion of Operating Principles

Referring next to FIG. 2, a beam 1 of transmitted radiation is shown to be radiated by a radar antenna (SAR) on board the satellite 2 during its orbit round the Earth. The beam 1 is directed obliquely to the scattering location P on the shaded surface producing a swath (as shown). Note that as the satellite 2 continues in its orbit the radiation is typically transmitted as a series of pulses to generate a well defined swath.

The scattering feature P on the shaded surface and within the swath scatters the transmitted pulse, and some of the scattered radiation travels back to the satellite 2 along a predetermined receive beam (not shown) for subsequent processing. The various processing steps for particular implementation in the invention are to be described in later sections of this description.

It is to be understood that that the relative dispositions and the relative motion of the radar and the selected scattering surface produce a Doppler frequency shift in the scattered radiation. The Doppler frequency shift is positive when the scatterer is in front of the satellite, zero when the scatterer is broadside of the satellite and negative when the scatterer is behind the satellite. In later sections of this description, it is shown how inventive profiling/processing of the radar returns provides a reliable and precise estimate of range (slant range) between the satellite and the local area of ground illuminated by the radar beam footprint. This range data, coupled with knowledge of the satellite in relation to the scattering surface enables reliable attitude data about the predefined roll axis to be determined. Further, it is shown how use can be made of the inventive radar to determine orientation about the predefined pitch axis, by profiling the Fourier transform of a longer pulse. This conveniently provides a profile of the Doppler offset associated with the radar beam, from which the particular radar beam pointing direction can be determined.

Having regard to the foregoing, it is to be also appreciated that the ground reflectance does not, in general, show repeatable, strong features with a known directional relationship to the satellite ground track. Also, the antenna beam pattern has relatively strong radial symmetry about the boresight line. It is therefore unlikely that yaw axis pointing information can be reliably derived from radar returns from the ground (without elevation beam steering). Indeed, in order to provide the roll and pitch attitude data relative to the ground it is essential that the Yaw pointing be maintained such that the spacecraft Roll axis remains aligned with the orbital velocity to within a couple of degrees (neglecting the question of any zero Doppler direction correction necessary as a result of the Earth's rotation under the spacecraft).

With Yaw pointing approximately maintained, it is thus noted that the Roll and Pitch attitude can be determined from the radar data, since changes in Roll pointing predominantly cause changes in range along boresight to ground and changes in Pitch pointing cause the Doppler spectrum of ground returns to shift. Under these conditions determination of the boresight vector B enables the radar antenna attitude to be computed.

The natural form of this vector (after processing) is in terms of boresight slant range and Doppler Centre Frequency (DCF) of the radar return (which relates directly to azimuthal angle). The Roll/Pitch attitude can be conveniently determined by simultaneous solution of the geometrical equations using these two quantities. To the first approximation, this can be achieved by reference to the local Earth geoid surface. However, precise solution is complicated by variation in terrain elevation relative to the geoid surface. The effect of local terrain height variation on pointing determination is comparable with, or greater than, the required determination accuracy. A possible approach to this problem is outlined in a later section of the description relating to FIG. 14.

Attitude Determination Pulse Requirements

At a typical space radar orbital altitude (say, 500 km) the slant range resolution required to determine the elevation beam pointing to $\frac{1}{10}^{th}$ the beam-width is no more demanding than about 500 m (considerably more relaxed than for imaging). As altitude decreases the necessary slant range resolution becomes more demanding (linearly) whilst the benefit of decreased antenna to ground distance, giving increased ground illumination power density, increases as the square of altitude. Taken together, these relationships mean that it is not necessary to use a standard imaging chirped radar pulse for attitude measurement. Instead, a burst of microwave carrier, whose duration is consistent with the highest resolution needed for elevation angle resolution, is quite sufficient. In practice this continuous wave (CW) burst (typically of the order of 1 µs duration) must be modulated by a tone of fixed frequency (say, 5 MHz) in order for the radar demodulator to pass the zero frequency (DC) signal frequency component. Using a pulse of this simplicity for elevation angle determination has the advantage of not requiring "de-chirping" (a task that requires a significant degree of signal processing).

In the along track direction the Doppler shift of the radar reflections is used to discriminate azimuth angles. The Doppler resolution required to measure azimuth angle to $\frac{1}{10}$th the azimuth beam-width depends upon the velocity of the antenna relative to the ground. For a typical space radar at 500 km altitude the radar pulse Doppler resolution must be of the order of 500 Hz. A simple tone modulated radar pulse of 2 ms duration is necessary for this azimuth angle determination accuracy (the elevation determination pulse cannot also be used for azimuth angle measurement because a CW burst lasting 1 µs has a frequency resolution of 1 MHz).

In a second embodiment of the invention, shown in FIG. 3, a satellite 6 carrying a SAR radar antenna moving relative to the Earth's surface transmits a series of pulses of radiation to three different locations P1, P2, P3 on the shaded surface via three transmit beams 10, 11, 12 illuminating a swath.

The baseline assumption here is that the capacity for the radar attitude sensor to detect rotation about the Yaw axis is low. In fact, the radar system will have limited elevation beam steering capability. The three transmit beams 10, 11, 12 as proposed, are each separated by approximately one beam width. As shown in FIG. 3, these beams, which are normally used in the Scansar imaging mode, are moved from P1 to P2 to P3 with timing intervals and dwell periods suited to this particular imaging task. Using the inventive radar in this way effectively removes the more or less cylindrical beam symmetry about the boresight direction.

Thus, as shown in FIG. 3, the system of the invention can be used to exhibit some sensitivity to Yaw axis rotation. If there is significant de-pointing about the Yaw axis, then the locus of the radar beam ground intersection points (P1, P2 and P3 for the elevation steered beams) does not lie on an iso-Doppler line. If each of the three beams 10, 11, 12 is used to establish the Doppler centre frequency of the returns from the ground, then the differences between these successive measurements can provide some measure of the Yaw de-pointing angle.

Note that the beam redirection timing and dwell periods for this attitude estimation task are necessarily the same as for Scansar imaging mode. Nor is it necessary for all three beam positions to be used. It may be sufficient, for example, to use only those beams corresponding to ground scattering points, P1 and P3.

Having regard to the foregoing, thus, transmitting one pair of radar transmit pulses, each a simple CW burst modulated by a fixed tone, one short and one long, is sufficient to make a single Roll—Pitch attitude measurement (Roll angle from slant range P1, Pitch angle from Doppler Shift P1), and transmitting at least one further pair of pulses at a different elevation angle allows Yaw angle to be determined from differential slant range—Doppler shift measurements (P2 and P3).

Since slant range and Doppler shift at the antenna boresight must be determined unambiguously, it is also important that only one pulse of each type is in flight at any one time. For a space radar at an altitude of 500 km (and a pulse round-trip time of approximately 4 ms) it may be possible to interleave the short pulse and long pulse transmission and receive windows, allowing a pair of pulses to be transmitted and their echoes received over a period of between 8 ms and 10 ms without violating the unambiguous reception requirement. Attitude determination certainty can be readily increased by making a succession of measurements.

The following sections of this description establish the principles of the inventive attitude sensor operation by separate discussions of:
  boresight slant range measurement issues,
  boresight Doppler Centre Frequency measurement issues,
  attitude determination issues (including compensating terrain height variation).

Principles of Slant Range Determination

The inventive radar can be used to measure range of returns along a reference direction in the elevation gain pattern of the antenna. The operational characteristics of the radar and the on-board signal processing techniques required to solve this problem are different from those needed for usual SAR imaging modes as discussed hereinafter.

Range Sampling

Since the time of flight of a radar pulse is only a few milliseconds (small compared with AOCS delays) the entire accessible swath in this invention can be sampled unambiguously (with only one radar pulse in flight at any one time). This greatly simplifies the data processing tasks.

Radar Pulse Characteristics

Provided adequate signal to noise can be achieved, continuous wave radar pulses can be used (carrier modulated by a fixed tone). The option for using chirped pulses to improve signal to noise ratio (S/N) is also available, although it is not preferred in view of the on-board processing load it would require.

A radar slant range resolution equivalent to $\frac{1}{10}^{th}$ the 3 dB width of the main elevation beam lobe would be sufficient. The shortest radar pulse is demanded at the lowest local angle of incidence. At 20° the maximum pulse length consistent with this resolution is 1.75 µs. A maximum sampling interval of 0.875 µs is required to give the angular required resolution for the lowest incidence angle and is more than sufficient at higher incidence angles. This sampling rate is very low compared to that required with SAR normal imaging modes.

Receive Window

In order to determine the range of the ground region from which a radar return is being received, the receive window duration should be long enough to accommodate the entire accessible swath. This corresponds to a receive window duration of the order 1.5 ms. The complete antenna elevation gain pattern can then be used to discriminate between different ground returns. This contrasts with normal imaging modes which use only the central part of the main lobe.

Echo Buffering

The minimum data sampling rate requirement (for the radar attitude sensor) is very low. If the receive chain minimum bandwidth anti-alias filter is used (~10 MHz) then the data input rate to the CORE radar packet assembler FIFO buffers is less than the their capacity to be emptied. Thus the echo data buffer is effectively unlimited.

Data Compression

Radar attitude sensor data is not destined for the ground and the data rate is relatively low so BAQ is unnecessary. In order to avoid unnecessary BAQ unpack processing the radar is operated with the BAQ off (as in the case of replica data).

Ranging By Correlation of Returns with Antenna Elevation Pattern

In a preferred embodiment of the invention as shown in FIG. 4, the received radar echo power is modulated by the antenna elevation gain pattern. As shown, this pattern is also smeared to a small extent because the radar pulse has a finite duration. The variation with time of the instantaneous received power is also envisaged to be heavily modulated by noise.

Note that the noisy return from a single pulse can be advantageously correlated with the known elevation gain pattern to yield the filtered variation in signal power with slant range.

Peak Detection

The greatest value in the correlation array locates the slant range of the elevation beam centre. It may be sufficiently accurate to locate the peak correlation value to the nearest slant range sample bin. It is also possible, with little extra computational load, to use the correlation peak value and a number of its nearest neighbours to perform a simple interpolation, giving the slant range along boresight on a non-integer range bin scale.

Refinements to the Principles of Slant Range Determination

FIG. 5 shows how a refinement to the range is determined in accordance with an embodiment of the invention by correlating radar returns with a predetermined centre null antenna pattern.

The dominant feature of any one radar echo is noise. The inventors have recognised how the range determination uncertainty can be reduced by averaging contributions from several echoes. The improvement achieved is greatest when the returns are fully statistically independent. It is proposed that several (~5) successive ranging echoes, separated by the along track main antenna lobe ground transit interval, are combined to form a single range estimate.

The antenna RF system can conveniently allow the imposition of a null along the elevation boresight direction. It may be an advantage to use this elevation antenna pattern for ranging pulses since the slope of the correlation function in the vicinity of the peak return may be increased.

Signal Transformations in Boresight Slant Range Determination

As previously described, FIG. 4 shows the primary signal transformations involved in the boresight slant range determination.

Note that equal steps in elevation angle (the natural frame for expressing the elevation gain pattern) correspond to non-linearly increasing slant range time steps as angle of incidence increases. It is therefore necessary to resample the time domain echo data according to this non-linear relationship in order to enhance/maximise the performance of the antenna pattern/echo power profile correlation.

Boresight Slant Range Determination Processing Steps and Parameters

FIG. 6 shows a chart of various processing steps for implementation in an embodiment of the invention.

As shown in FIG. 6, echo data accessed from the DMU is in packet form and must be unpacked.

A simple time domain filter (SR3) (preceded by a frequency shift SR2) giving a data rate reduction (followed by a shorter FFT) requires fewer Flops than taking the FFT of the entire data set. The time domain phase ramp vector can be pre-computed and made available as an array.

The range resample step (SR4) can in practice be combined with the average filter at little extra cost, by selecting the position of contiguous groups of samples for averaging according to the output resample intervals required by the geometry.

Correlation of the elevation antenna pattern with the received range power profile (SR5 to SR8) is conveniently efficiently achieved as shown, using the FFT/multiply/IFFT sequence on the reduced rate sample sets.

The cost of peak detection (SR9) and a simple interpolation (SR10) to find the slant range at boresight is very low. An alternative is to extend the data prior to the final IFFT (by zero padding) to yield an interpolated output array. The cost is that of a longer IFFT.

The next section sets out the preferred processing steps at top level necessary for deriving the radar antenna altitude information from the received radar echo data.

Attitude Determination Processing

FIG. 7 identifies the preferred top level processing steps necessary to derive the radar antenna attitude from received radar echo data. As shown in the Figure, the top left input represents raw sampled echo data for attitude determination pulse pairs as available from the radar hardware (input from the radar Data Management Unit (DMU)).

These processing steps are conveniently software operations which are carried out in real-time, onboard the radar platform. Primary parameter data inputs are also identified.

Note that raw radar echo data from the ground are, in general, very noisy but also occupy the entire extent of the 2dimensional antenna pattern through which the radar pulses pass. As shown, after transfer from the radar data management unit and unpacking, this data is correlated (in slant range and Doppler space) with the elevation and azimuth antenna patterns respectively. From these correlations, precise peak response positions can be found which correspond to the antenna boresight direction. Conveniently, these are translated to slant range and Doppler frequency using basic radar and geometrical parameters.

Solution of the Roll, Pitch and Yaw Euler rotations (which uses and outputs the antenna pointing direction cosine matrix or DCM) is conveniently evolved by an iterative process, at the core of which is a standard Newton Raphson technique adapted for the purpose. In the shown embodiment, precise pointing solution requires a coarse terrain elevation map input (since terrain height influences the viewing geometry).

Note that the radar platform is required only to provide the antenna motion state vector (position and velocity vectors in 3-space), propagated from GPS measurements by the AOCS to the moment of attitude measurement.

To process one pair of elevation-azimuth pulses requires less than 1 million arithmetic operations (many of which can be integer operations) and is typically expected to execute in about 50 ms or less on a typical space qualified processor. For example, this extra load could be handled by a standard computer card in real-time. A simple, low volume data interface to the platform ACS enables real-time attitude control based on radar measurements.

A coarse terrain elevation map (of the order of 8 megasamples) is conveniently made available to the processor. This is by far the largest element of all the processing memory requirements.

Principles of Doppler Centre Frequency Determination

The Doppler spectrum of radar returns from the ground can be used to evaluate the along track beam pointing. Correlation of this Doppler spectrum with the azimuth antenna pattern relates the Doppler spectrum peak power to the azimuth boresight pointing of the antenna. The operational characteristics of the radar and the on-board signal processing techniques required to solve this problem are different from those needed for usual SAR imaging modes and from those required for range measurement. These features are defined in the following sections.

Doppler Sampling

Unlike in normal imaging modes, the along track phase progression of range compressed data that results from spacecraft motion between radar pulses is not necessarily of interest. Instead, processing can be carried out with a far greater bandwidth than is normally used for a space-borne imaging SAR, such that the azimuth beam pattern is unambiguously sampled.

In principle, the return from a single pulse can be used to establish the Doppler frequency of the peak power return.

Radar Pulse Characteristics

Provided adequate signal to noise is achieved, continuous wave radar pulses could be used if desired (carrier modulated by a fixed tone).

A Doppler frequency resolution equivalent to $\frac{1}{10}^{th}$ the width of the main azimuth beam lobe is considered sufficient to satisfy the pointing determination requirements. At a sub-satellite ground velocity of the order of 7500 ms$^{-1}$ (neglecting the effect of the Earth's rotation on this estimate) the antenna main lobe 3 dB points typically occur at approximately ±2.5 kHz with respect to boresight. To resolve 500 Hz ($\frac{1}{10}^{th}$ of the main lobe Doppler range) demands a minimum pulse duration of 2 ms. Core radar typically allows a maximum pulse length of 2 ms.

Note that the required frequency resolution typically demands a pulse duration about 1000 times that for ranging purposes. It is therefore clear that two distinct radar pulse types are required to solve both the ranging and the Doppler spectrum location problems.

Receive Window

The receive window duration is required to be long enough to accommodate returns from entire accessible swath (~1.5 ms for a short pulse) and to accommodate the extended azimuth pulse (2 ms).

Echo Buffering

The minimum data sampling rate requirement is very low. If the receive chain minimum bandwidth anti-alias filter is used (~10 MHz), then the data input rate to the Core packet assembler FIFO buffers is less than the capacity to be emptied. Thus, the echo data buffer is effectively unlimited.

Azimuth Processing Bandwidth

The main antenna lobe and the first two side-lobes together contain more than 98% of the return energy. In principle using only these parts of the corresponding Doppler spectrum is sufficient to make the Doppler measurement required. To accommodate these parts of the antenna pattern (with the boresight pointing in the zero Doppler shift direction) requires a bandwidth of approximately 30 kHz.

With an azimuth pointing uncertainty of ±2°, the Doppler centre frequency may be shifted within the approximate range of ±15 kHz of zero. Thus, the maximum bandwidth of the useful part of the return signal is of the order of 60 kHz. It can be made less than this by choosing to include the contributions from fewer side-lobes.

Correlation of Doppler Spectrum with Antenna Doppler Pattern

Correlating the Doppler spectrum of the radar return with the azimuth antenna pattern (expressed in terms of Doppler frequency relative to a zero Doppler pointed boresight) advantageously filters the data allowing the Doppler frequency at which peak power is returned to be determined. This is clearly shown in FIG. 8.

Peak Detection

The greatest value in the correlation array locates the Doppler frequency of the azimuth beam centre. It may be sufficiently accurate to locate the peak correlation value to the nearest Doppler sample bin. It is also possible, with little extra computational load, to use the correlation peak value and a number of its nearest neighbours to perform a simple interpolation, giving the Doppler frequency along boresight on a non-integer sample scale.

Refinements to the Principles of Doppler Centre Frequency Determination

The boresight DCF determination uncertainty can be conveniently reduced by averaging contributions from several echoes. The improvement achieved is greatest when the returns are fully statistically independent. It is therefore proposed that several (~5) successive echoes, separated by the along track main antenna lobe ground transit interval, be combined to form a single DCF estimate.

Signal Transformations in DCF Determination

FIG. 9 shows a proposed sequence of preferred DCF processing steps for implementation in the invention. Signals are shown in the form most convenient to define the processing principles.

It is assumed that the radar pulse is modulated with a tone in the region of 5 MHz and that the lowest channel filter bandwidth is of the order of 10 MHz.

The bandwidth of the signal required for correlation with the antenna pattern spectrum is only about 60 kHz. Thus, filtering is necessary and, in the shown process, the sample rate can be reduced by a factor approaching 200:1.

Least signal impairment is likely to be achieved by means of a frequency domain filter applied to the entire input sample set. However, performing an FFT on the whole input sample set would involve a computational load of some 3.6MFlops.

The signal transformations shown in FIG. 9 provide a compromise implementation in which filtering can be achieved by a frequency shift and sample averaging in the time domain followed by frequency domain filtering on a shorter data point set. This approach conveniently uses considerably fewer Floating Point Operations (Flops) without compromising performance unduly.

Correlation of the narrow band received Doppler spectrum with the azimuth antenna pattern spectrum (evaluated at zero Doppler boresight pointing) is efficiently performed by an FFT-mutliply-IFFT sequence even for the relatively short sample set (~210 samples) that contains the wanted information.

DCF Determination Processing Steps and Parameters

FIG. 10 shows another chart of various processing steps for implementation in an embodiment of the invention.

The preferred DCF determination processing steps and their input parameters are now described in the context of mixed time domain/frequency domain filtering. At each point in the sequence an indication of the data set volume (for a single echo) is given, from which the total floating point operation load is evaluated.

As shown, the time domain frequency shift (DCF2) (a down-shift equal to that of modulation tone) is conveniently achieved by multiplication of the data by a pre-computed phase ramp vector.

The average filter (DCF3) sums N consecutive samples to generate each new data point, reducing the sample rate by a factor of N. The resultant data set is zero padded for the subsequent radix 2 FFT. If the frequency domain filter (DCF5) is defined as a rectangular window then no multiplication is required. The data points distributed about DC could simply be passed to a shorter array.

The correlation of the data power spectrum with that of the antenna pattern is of interest, so detection is necessary. Correlation is efficiently carried out as shown, using FFT-multiply-IFFT steps (DCF7 to DCF9). It is likely that knowing the Doppler frequency of the bin containing the peak correlation value is sufficiently accurate. However, the computation load imposed by a quadratic interpolation using the peak value and its nearest neighbours is insignificant compared with the other processing steps. An alternative is to extend the data prior to the final IFFT (by zero stuffing) to yield an interpolated output array. The cost is that of a longer IFFT.

Radar Attitude Sensor Operating Timeline

A typical radar image scene is reconstituted from typically a minimum of 10000 echoes and frequently involves 30000 or more. The duration of this continuous radar pulse burst is typically between 3 and 20 seconds.

In contrast, one pair of radar attitude determination pulses requires 10 ms or less of radar time, as shown in FIG. 11. Note that the attitude determination processing time is not included on this timeline because, in principle, processing can be performed whilst the radar is being used for imaging data acquisition purposes.

Radar attitude determination (and attitude control actions based upon it) can conveniently be carried out at times before, between and after imaging events. The inventive radar can be used to obtain attitude references during an imaging period too, although the loss of 20 to 30 consecutive image echoes to attitude determination pulses leads to a low level of image quality degradation (grating lobes) in the final image. However, this is a mode of operation that it is unnecessary to consider since the radar attitude sensor can be supported (for control purposes) by low cost solid state gyros which can provide attitude measurements during imaging periods, obviating the need to interrupt the imaging pulse sequence at all. With this ACS configuration attitude determination propagation and control would be continuous, based on occasional radar attitude sensor references "filled in" by gyro data.

Principles of Radar Pointing Determination

In this section, the principles for pointing determination using the inventive radar as the sensor are discussed.

The co-ordinate frame and necessary parameters are defined. A pointing determination method is discussed.

Co-ordinate Frame

Once an antenna boresight slant range and DCF data pair has been computed, it can be used to establish the boresight pointing in the natural co-ordinate frame of the instrument. FIG. 12 defines this frame in terms of elevation angle (e) in the zero Doppler shift plane and azimuth angle (a) between the zero Doppler shift plane and the plane containing the boresight vector (and the local nadir line).

Radar Pointing Determination Input Parameters

Expressed in terms of range to the ground and Doppler shift, the Doppler surface observed by the radar is determined by the relative position and relative motion of the radar and points on the ground.

This Doppler surface can be conveniently used to solve for the azimuth and elevation pointing of the radar antenna.

Ground elevation correction can be applied once the approximate ground location of the antenna boresight vector is known.

Input parameters are the orbital parameters, an Earth geoid model (e.g. GEM6), Earth rotation data and limit parameters (e.g. those defining an "over the horizon view").

A terrain elevation map is also used.

Input measurements include a range, dcf ,time triplet from the radar, spacecraft pointing data and an estimate of the local ground elevation (zero for the initial estimate of the azimuth and elevation pointing).

Radar Pointing Estimation

FIG. 13 is an explanatory diagram relating to the estimation of radar pointing in accordance with an embodiment of the invention.

An orbital state vector, a model of the local Earth geoid surface and an Earth rotation model are considered sufficient to define the Doppler surface viewed by the radar.

An initial estimate of the azimuth and elevation angles can be used with the local nadir position to define the Earth geoid region to be used. From this and the relative motions, it is possible to compute the Doppler surface in terms of range and Doppler frequency.

Given the measured radar range, dcf and approximate initial values of azimuth and elevation angles, it is possible to solve iteratively for the precise azimuth and elevation angles consistent with the measured range, dcf pair for the particular viewing geometry. As shown, this is obtained initially by assuming a local terrain elevation of zero.

In the shown process, the boresight ground location can readily be computed, enabling a ground elevation map to be accessed for a more precise pointing estimation.

Pointing Estimate Correction for Terrain Height

Though the estimation method described above is inherently precise, if the radar is viewing ground with significant height above the Earth geoid surface datum, the first pointing estimate obtained will be in error. The extent of this error depends upon the height of the ground viewed by the radar beam. The inventors have recognised how it can be corrected.

FIG. 14 shows how the primary component of the radar attitude determination computation can be repeated with inputs derived from the first pointing estimate (in, particular the local terrain height) to give a pointing estimate corrected for local terrain height.

Only a single terrain height correction iteration can be justified, since the density of the required terrain height map is set by the dimensions of the radar beam on the ground.

The best possible pointing estimate is obtained for radar returns from a region of ground which is flat and horizontal (over the entire the illuminated area), though perhaps elevated. The assumption of flat, horizontal ground is embedded in the antenna patterns proposed for the correlation process (some such assumption has to be made). Sloping ground over the beam footprint impairs the certainty of the measurement. Ground with changing slope over the beam footprint impairs the measurement yet more seriously. In general it is likely that the radar will be looking at this type of ground.

Thus, in the worst case, the pointing determination uncertainty is comparable with the main lobe angular width. Thus, there is little to be gained (except under the best viewing conditions) from using a terrain map composed of data points more closely separated than the main beam pattern width and height.

A terrain map with samples separated by 15 km (the smallest near-swath main beam footprint dimension) typically consists of between 2.5 and 5.0 million height samples. This can be considered a reasonable data volume.

On-Board Processing Facilities

It is envisaged that there are at least two capable processing facilities on-board the inventive radar. The radar itself contains significant data processing capabilities.

The "service module" is advantageously equipped with at least one significant processor to handle spacecraft functions such as the AOCS and spacecraft data handling functions.

Since the volume of raw radar data acquired for attitude determination is relatively high, it is envisaged that this data is processed (at least to "range, dcf and time stamp" level) by the radar processor. If the processor normally supplied with radar equipment is insufficient to handle this extra load, a further standard processing card can be added to the radar system with relative ease.

Once the range, dcf data have been computed it is an open question as to whether the attitude should be determined (and corrected for terrain height variation) by the radar processors or by the ACOS computer. Certainly a radar—AOCS computer data transfer interface must exist. The volume of data to be transferred between these systems (once the raw radar data has been processed) is low. However the terrain map data is of significant size and must be accessible to the processor that requires it.

Despite the significant volume of the terrain map data, an efficient division of processing tasks is to process the raw radar data in CORE, passing the range, dcf, timestamp data to the AOCS processor for attitude determination.

Options for Control Based On Radar Attitude Sensor Data

As previously explained, the inventors have proposed a low cost radar concept. With current RF technologies, the objective of low cost precludes a SAR antenna with large numbers of phase centres. Thus, electronic beam steering in either the elevation direction (especially) or in the azimuth direction cannot be considered. For similar reasons, an antenna that can be mechanically steered relative to the spacecraft will not be considered. The only option for elevation beam control is to re-point the entire spacecraft about the roll axis in advance of scene data acquisition. Roll axis control is unlikely to be particularly agile for three primary reasons:

it is envisaged that the AOCS primary actuator authority will not be high (magneto-torquers),
there will be significant time lag in the Radar Attitude Sensor data history (compared with the primary AOCS sensors), and
the frequency of Radar Attitude Sensor outputs is likely to be low (compared with the primary AOCS sensors)

making fast, stable closed loop position control impossible (unless supported by gyros). The Control Action Philosophy is discussed hereinafter.

Two reasonable options remain for ensuring that the correct along track data is collected. These are to:
adjust the radar operation timing or to
re-point the spacecraft about the pitch axis.

The preferred solution is to use the Radar Attitude Sensor data to command appropriate radar operation timing, because:

though greater pitch actuator authority might be available (taking advantage of larger spacecraft physical dimensions), by the same token the pitch inertia is likely to be at least an order of magnitude greater than that about the roll axis, and
the time lag and Radar Attitude Sensor data frequency considerations outlined above also apply about the pitch axis.

Yaw Steering

In view of the relatively high symmetry of the radar beam about the boresight direction, the radar instrument cannot be used to support a low cost AOCS over the implementation of yaw steering.

Control Action Philosophy

It is assumed that the spacecraft can be manoeuvred into a particular imaging attitude using the coarse pointing capabilities of the AOCS, in advance of the data acquisition.

Using an ACS capable of only coarse attitude determination (and hence spacecraft pointing) compared with the radar antenna pointing requirement (and without the option of electronic elevation beam steering for a low cost radar mission), there is no alternative to using the Radar determined Roll pointing error to command the fine Roll axis attitude control (once the spacecraft has executed its coarse manoeuvre).

The radar determined Pitch pointing error may be used either to:
command the spacecraft fine pitch pointing, or to
command appropriate radar pulse transmission timing when the radar is in imaging mode.

Two strategies are proposed for the second option. After a coarse manoeuvre the radar is used to determine the pitch pointing error. Making use of this data may then involve:
ground intervention to command the appropriate radar pulse timing, or
automatic on-board advance/retard to pre-commanded radar pulse timings (computed nominally for zero pointing error).

Having described the present invention in the foregoing by reference to several particular embodiments, it is to be appreciated that the embodiments are in all respects exemplary and that modifications and variations thereto are possible without departure from the spirit and scope of the appended claims. Thus, for example, whilst the invention has been described by reference to synthetic aperture radar (SAR), the teaching of the invention could be equally applicable to other radar types (for example, forward-looking imaging radar and highly-squinted imaging radar which in use look half sideways/half forwards). Furthermore, the invention is applicable to any radar waveband. Furthermore, because the invention bears a definite low cost advantage, it finds utility in various spaceborne applications as well as airborne applications.

APPENDIX

List of Acronyms

| | |
|---|---|
| AOCS | Attitude and Orbit Control System |
| BAQ | Block Adaptive Quantisation |
| CORE | Common Radar Elements |
| CW | Continuous Wave |
| DMU | Data Management Unit |
| FIFO | First In First Out |
| FRT | Faraday Rotation Tracker |
| H | Horizontal Polarisation |

-continued

| | | |
|---|---|---|
| H/W | Hardware | |
| I | Integer | |
| IFE | Intermediate Frequency Equipment | |
| Intops | Integer operations per second | |
| MIPS | Millions of instructions per second | |
| Q | Quadrature | |
| RF | Radio Frequency | |
| SAR | Synthetic Aperture Radar | |
| Sqrt | squareroot | |
| S/W | Software | |
| TBD | To be defined | |
| V | Vertical Polarisation | |

The invention claimed is:

1. A radar imaging apparatus for imaging a surface from a platform moving relative to the surface comprising:
transmitting means for transmitting radiation to the surface;
receiving means for receiving the radiation, after it has been scattered from the surface, along a predetermined receive path; and
processing means for processing signals representative of the received radiation to provide radar attitude information, the attitude information being representative of the pointing of the platform resolved into a number of axial components, and wherein the attitude information is derived in dependence upon a determination of a range characteristic relative to the surface and upon a determination of a Doppler frequency distribution associated with the scattered radiation, wherein said processing means comprises a first circuitry portion arranged to correlate the received data associated with the scattered radiation with predetermined radar antenna pattern data, a second circuitry portion arranged to derive peak position data represnative of the radar antenna boresight direction, a third circuitry portion arranged to transform said peak position data into slant range and Doppler frequency space, and a fourth circuitry portion arranged to determine said attitude information in dependence upon the various circuitry operations.

2. A radar imaging apparatus as claimed in claim 1 wherein a separate circuitry portion is provided for determining roll, pitch and yaw pointing data associated with the radar platform, said pointing data being determined by derivation of the attitude information and by selective input of terrain elevation data so as to take account of variations in the radar viewing geometry with terrain elevation.

3. A radar imaging apparatus as claimed in claim 2 wherein the transmitting means is arranged to transmit a first set of radar pulses corresponding to a first elevation angle relative to the surface, which set of radar pulses includes a ranging radar pulse emitted at a first predetermined time, and a frequency-discriminating radar pulse emitted at a second predetermined time, said receiving means being arranged to receive said pulses at different predetermined times, and said processing means being arranged to derive roll and pitch-axis attitude data in dependence upon the determination of a slant range and a Doppler frequency shift associated with the received pulse characteristics.

4. A radar imaging apparatus as claimed in claim 3 wherein there are a plurality of such sets of radar pulses corresponding to a plurality of elevation angles relative to the surface, and one or more of such sets of pulses are received and processed to derive Yaw-axis attitude data in dependence upon the determination of a differential slant range and a Doppler frequency shift associated with the receive pulse characteristics.

5. A radar imaging apparatus as claimed in claim 1 wherein the transmitting means is adapted to emit radar pulses, each pulse modulated by a constant frequency.

6. A radar imaging apparatus as claimed in claim 1 wherein the transmitting means is adapted to emit chirped radar pulses.

7. A radar imaging apparatus as claimed in claim 1 wherein the apparatus is a synthetic aperture imaging apparatus.

8. A spacecraft incorporating an imaging apparatus as claimed in claim 1.

9. A satellite communications system incorporating an imaging apparatus as claimed in claim 1.

10. A method of imaging a surface from a platform moving relative to the surface, the method comprising the steps of:
transmitting radiation to the surface;
receiving the radiation, after it has been scattered from the surface, along a predetermined receive path; and
processing signals representative of the received radiation to provide radar attitude information, the attitude information being representative of the pointing of the platform resolved into a number of axial components and wherein the attitude information is derived in dependence upon a determination of a range characteristic relative to the surface and upon a determination of a Doppler frequency distribution associated with the scattered radiation, further comprising correlating the received data associated with the scattered radiation with predetermined radar antenna pattern data, deriving peak position data representative of the radar antenna boresight direction, transforming said peak position data into slant range and Doppler frequency space, and determining the attitude information in dependence upon such various operations.

11. In a radar imaging apparatus comprising a moving platform mounting a radar, the radar including transmitting means, the transmitting means providing a plurality of transmit beams, receiving means, and signal processing means, a method of imaging a surface comprising:
receiving transmitted radar signals scattered from the surface, and processing the signals to determine (i) a range characteristic of apparatus relative to the surface, and (ii) a Doppler frequency distribution characteristic of the received signals;
determining from at least one of said range characteristic and said Doppler frequency distribution characteristic a roll attitude of the apparatus about a roll axis, a pitch attitude of the apparatus about a pitch axis, and a yaw attitude of the apparatus about a yaw axis; and
adjusting at least said transmitting means so as to compensate for said roll attitude, said pitch attitude and said yaw attitude in said imaging.

12. A method according to claim 11, wherein said range characteristic is slant range.

13. A method according to claim 11, wherein said range characteristic is differential slant range between said plurality of transmit beams.

14. A method according to claim 11, wherein said Doppler frequency distribution characteristic is Doppler Centre Frequency.

15. A method according to claim 11, wherein said adjusting comprises repointing the apparatus about at least one of said roll axis, pitch axis and yaw axis.

16. A method according to claim 11, wherein said transmitting means provides a beam steering capability, and said adjusting comprises steering said beams.

17. A method according to claim 11, wherein said adjusting comprises adjusting the timing of said transmitting means and said receiving means.

18. A radar imaging apparatus comprising a moving platform mounting a radar, the radar including transmitting means for transmitting a plurality of transmit beams, receiving means for receiving transmitted radar signals scattered from the surface, and signal processing means for processing received signals, the processing means including:

means to determine a range characteristic of apparatus relative to the surface, and means to determine a Doppler frequency distribution characteristic of the received signals;

means for determining from at least one of said range characteristic and said Doppler frequency distribution characteristic, a roll attitude of the apparatus about a roll axis, a pitch attitude of the apparatus about a pitch axis, and a yaw attitude of the apparatus about a yaw axis; and means for adjusting at least said transmitting means so as to compensate for said roll attitude, said pitch attitude, and said yaw attitude in said imaging.

19. Apparatus according to claim 18, wherein said means for adjusting comprises means for repointing apparatus about at least one of said roll axis, pitch axis and yaw axis.

20. Apparatus according to claim 18, wherein said transmitting means includes means for steering said beams, and said means for adjusting is arranged for steering said beams.

21. Apparatus according to claim 18, wherein said means for adjusting comprises means for adjusting the timing of said transmitting means and said receiving means.

\* \* \* \* \*